(12) United States Patent
Alapati et al.

(10) Patent No.: US 8,892,949 B2
(45) Date of Patent: *Nov. 18, 2014

(54) EFFECTIVE VALIDATION OF EXECUTION UNITS WITHIN A PROCESSOR

(71) Applicant: International Business Machines Corporation, Armonk, NY (US)

(72) Inventors: Sangram Alapati, Austin, TX (US); Prathiba Kumar, Udumalpet (IN); Varun Mallikarjunan, Bangalore (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,839

(22) Filed: Nov. 1, 2013

(65) Prior Publication Data

US 2014/0059383 A1 Feb. 27, 2014

Related U.S. Application Data

(63) Continuation of application No. 13/159,564, filed on Jun. 14, 2011.

(51) Int. Cl.
*G06F 11/00* (2006.01)
*G06F 11/263* (2006.01)
*G06F 11/22* (2006.01)

(52) U.S. Cl.
CPC .......... *G06F 11/263* (2013.01); *G06F 11/2236* (2013.01)
USPC .............. 714/33; 714/715; 714/796; 712/234

(58) Field of Classification Search
CPC ... G06F 11/2236; G06F 11/2273; G06F 7/02; G06F 9/30043; G06F 9/30098; G06F 9/3834; G06F 9/3836; G11C 2029/0401; G11C 29/16
See application file for complete search history.

(56) References Cited

U.S. PATENT DOCUMENTS 5,748,879 A    5/1998 Kobayashi
5,956,478 A *  9/1999 Huggins .......................... 714/33

(Continued)

OTHER PUBLICATIONS

USPTO U.S. Appl. No. 13/159,564.

(Continued)

*Primary Examiner* — Scott Baderman
*Assistant Examiner* — Jason Bryan
(74) *Attorney, Agent, or Firm* — Francis Lammes; Stephen J. Walder, Jr.; Parashos T. Kalaitzis

(57) ABSTRACT

A mechanism is provided for effectively validating execution units within a processor. A branch test pattern is generated for execution by an execution unit that is under validation testing. An execution pattern is selected from a set of execution patterns thereby forming a selected execution pattern. The selected execution pattern is loaded into a condition register. The branch test pattern is executed by an execution unit based on the selected execution pattern in the condition register. Responsive to the branch test pattern ending, values output from the execution unit during execution of the branch test pattern are compared to a set of expected results. Responsive to a match of the comparison, the process is repeated for each execution pattern in the set of execution patterns. Responsive to a match of the comparison for the execution patterns in the set of execution patterns, the execution unit is validated.

7 Claims, 8 Drawing Sheets

(56) References Cited

U.S. PATENT DOCUMENTS

| | | | |
|---|---|---|---|
| 6,026,413 | A | 2/2000 | Challenger et al. |
| 6,079,006 | A | 6/2000 | Pickett |
| 6,446,241 | B1 | 9/2002 | Mobley et al. |
| 6,732,356 | B1 | 5/2004 | Chen |
| 6,751,792 | B1 | 6/2004 | Nair |
| 6,782,518 | B2 | 8/2004 | Decker |
| 7,441,110 | B1 | 10/2008 | Puzak et al. |
| 7,533,294 | B2 | 5/2009 | Mishra et al. |
| 7,661,023 | B2 | 2/2010 | Arora et al. |
| 2002/0144101 | A1 | 10/2002 | Wang et al. |
| 2003/0188044 | A1 | 10/2003 | Bohizic et al. |
| 2003/0188224 | A1 | 10/2003 | Decker |
| 2004/0008825 | A1* | 1/2004 | Seeley et al. ............... 379/32.01 |
| 2006/0107158 | A1 | 5/2006 | Mishra et al. |
| 2006/0174174 | A1 | 8/2006 | Bohizic et al. |
| 2008/0126771 | A1 | 5/2008 | Chen et al. |
| 2008/0235498 | A1* | 9/2008 | Yamada ......................... 712/227 |
| 2010/0037036 | A1 | 2/2010 | Hum et al. |
| 2010/0262813 | A1 | 10/2010 | Brown et al. |

OTHER PUBLICATIONS

USPTO U.S. Appl. No. 13/716,849.

Moudgill, Mayan et al., "Validation of Turandot, a Fast Processor Model for Microarchitecture Exploration", IEEE International Performance, Computing and Communications Conference (IPCCC), Feb. 1999, 7 pages.

* cited by examiner

US 8,892,949 B2

EFFECTIVE VALIDATION OF EXECUTION UNITS WITHIN A PROCESSOR

BACKGROUND

The present application relates generally to an improved data processing apparatus and method and more specifically to mechanisms for effective validation of execution units within a processor.

A flow of instruction execution of a computer program may be determined by branch instructions. The various paths taken in the course of the instruction execution determine the result of the program. Conditional branches, which are dependent upon results of previous instructions to determine the result of the condition, are bottlenecks in the program execution. Speculative execution, branch target buffer, branch prediction table, or the like, are just some of the micro-architectural features introduced to overcome such bottlenecks. Verifying the functionality of a branch unit and its allied micro-architectural features and architectural correctness of the processor in conjunction with these micro-architectural features plays a central role in post-silicon validation. Currently, the algorithms used for such validation deal with only static patterns. One disadvantage with static branch pattern test generation is a failure to stress the branch unit to the extreme since the branch path is predetermined and will not change during every re-execution of the same test case. Further, modern day processors have added numerous advanced features to the branch unit, such as a local predictor table, a global predictor table, and a global history vector, all of which can be stressed only with varying branch patterns in a test case.

SUMMARY

In one illustrative embodiment, a method, in a data processing system, is provided for effectively validating execution units within a processor. The illustrative embodiment generates a branch test pattern for execution by an execution unit that is under validation testing. The illustrative embodiment selects an execution pattern from a set of execution patterns thereby forming a selected execution pattern. The illustrative embodiment loads the selected execution pattern into a condition register. The illustrative embodiment executes the branch test pattern using an execution unit based on the selected execution pattern in the condition register. The illustrative embodiment compares values output from the execution unit during execution of the branch test pattern to a set of expected results in response to the branch test pattern ending. The illustrative embodiment repeats the process for each execution pattern in the set of execution patterns in response to a match of the comparison. The illustrative embodiment validates the execution unit in response to a match of the comparison for the execution patterns in the set of execution patterns.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for effectively validating execution within a processor. Again, current validation algorithms deal with only static pattern for validating branch units. Therefore, in order to properly stress a branch unit during validation, the illustrative embodiments provide a test case with dynamic branch patterns that stresses a branch unit under validation to the extreme. Further, the illustrative embodiments provide for generating a controlled dynamic pattern test case to stress any advanced features within a processor. That is, the dynamic pattern test case of the illustrative embodiments provides use of an advanced algorithm to generate critical test-cases to validate issues related to icache, branch prediction and execution, speculative execution, instruction fetch unit (IFU), or the like.

Figure 1:
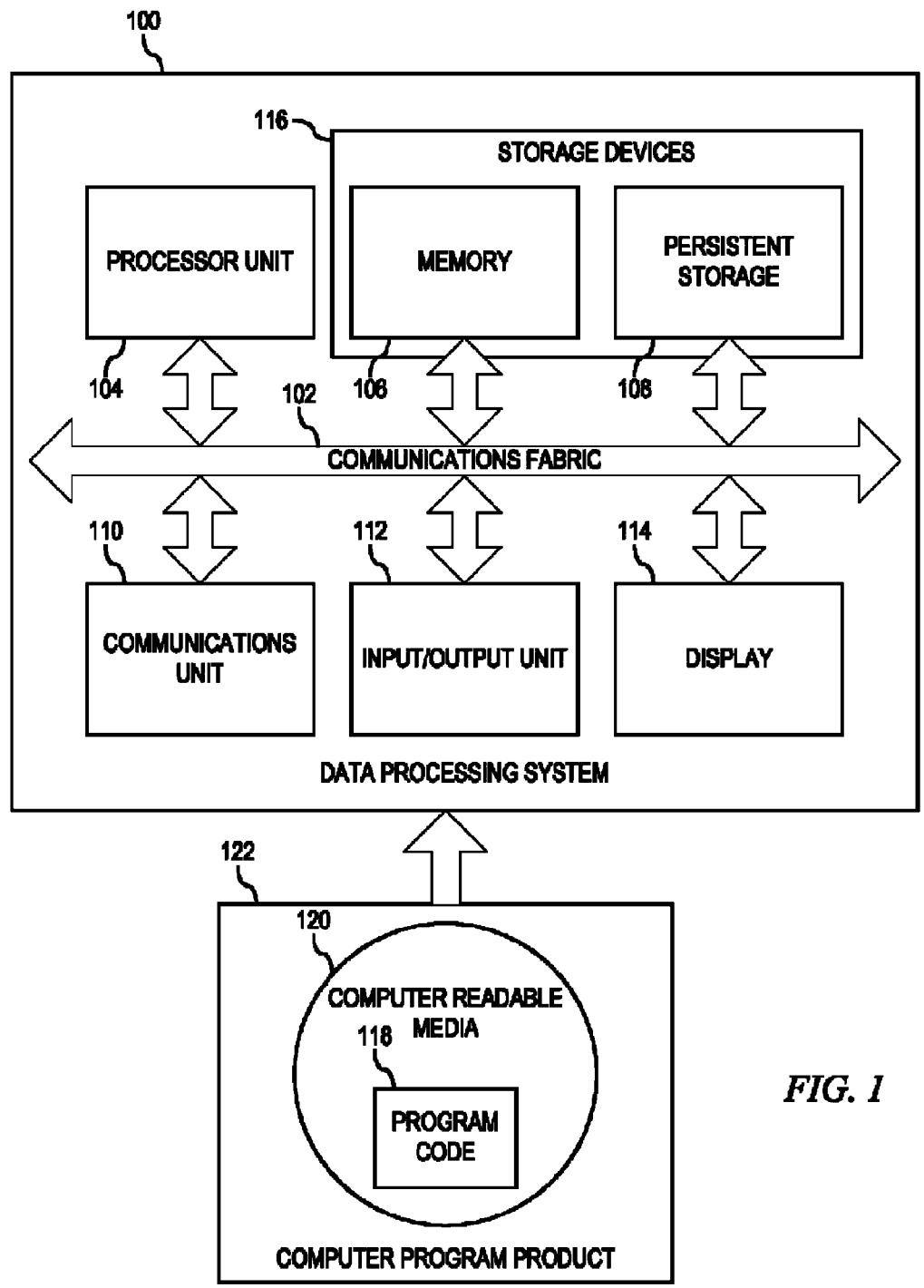
FIG. 1 depicts a block diagram of a data processing system in which illustrative embodiments may be implemented.
Figure 2:
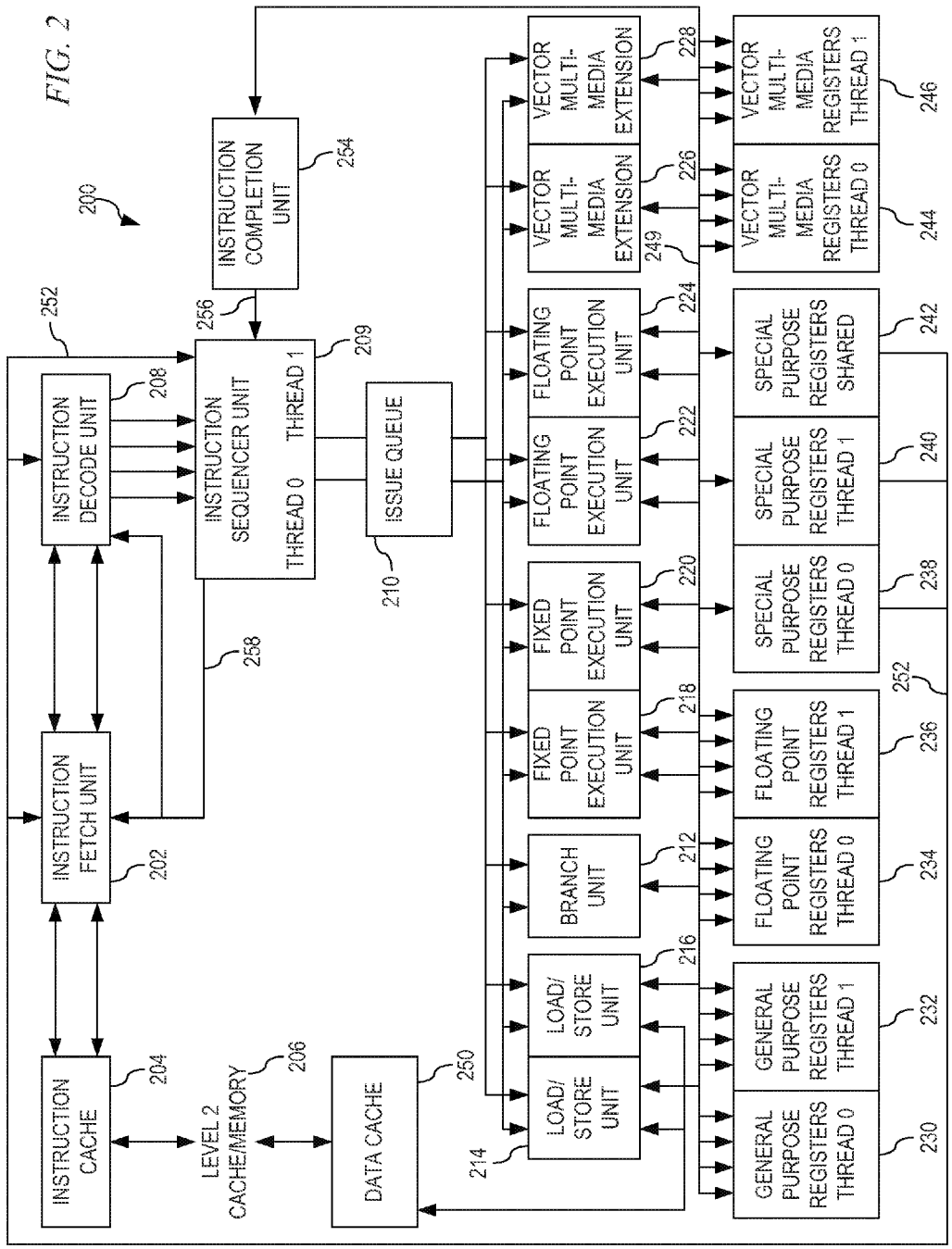
FIG. 2 depicts an exemplary block diagram of a conventional dual threaded processor design showing functional units and registers in accordance with an illustrative embodiment.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data, processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data, that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing, FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data.

Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Again, the illustrative embodiments provide a mechanism for effectively validating branch processing engine and associated units within a processor. The illustrative embodiments provide a branch exerciser that creates a set of branch nodes or branch blocks and generates a set of branch paths for instruction execution to follow. The branch exerciser generates the set of branch paths in such a fashion so as to avoid infinite loops and deadlocks but still maintain an extreme dynamism in the branch execution. The branch exerciser provides a validation that is both extensible and enables verification of the branch unit as well as verification that the various micro architectural features related to branch processing and speculative execution do not corrupt the architectural state of the processor. The illustrative embodiments also provide for controlling the branch pattern via user inputs and generation of controlled pseudo-random test patterns.

Figure 3:
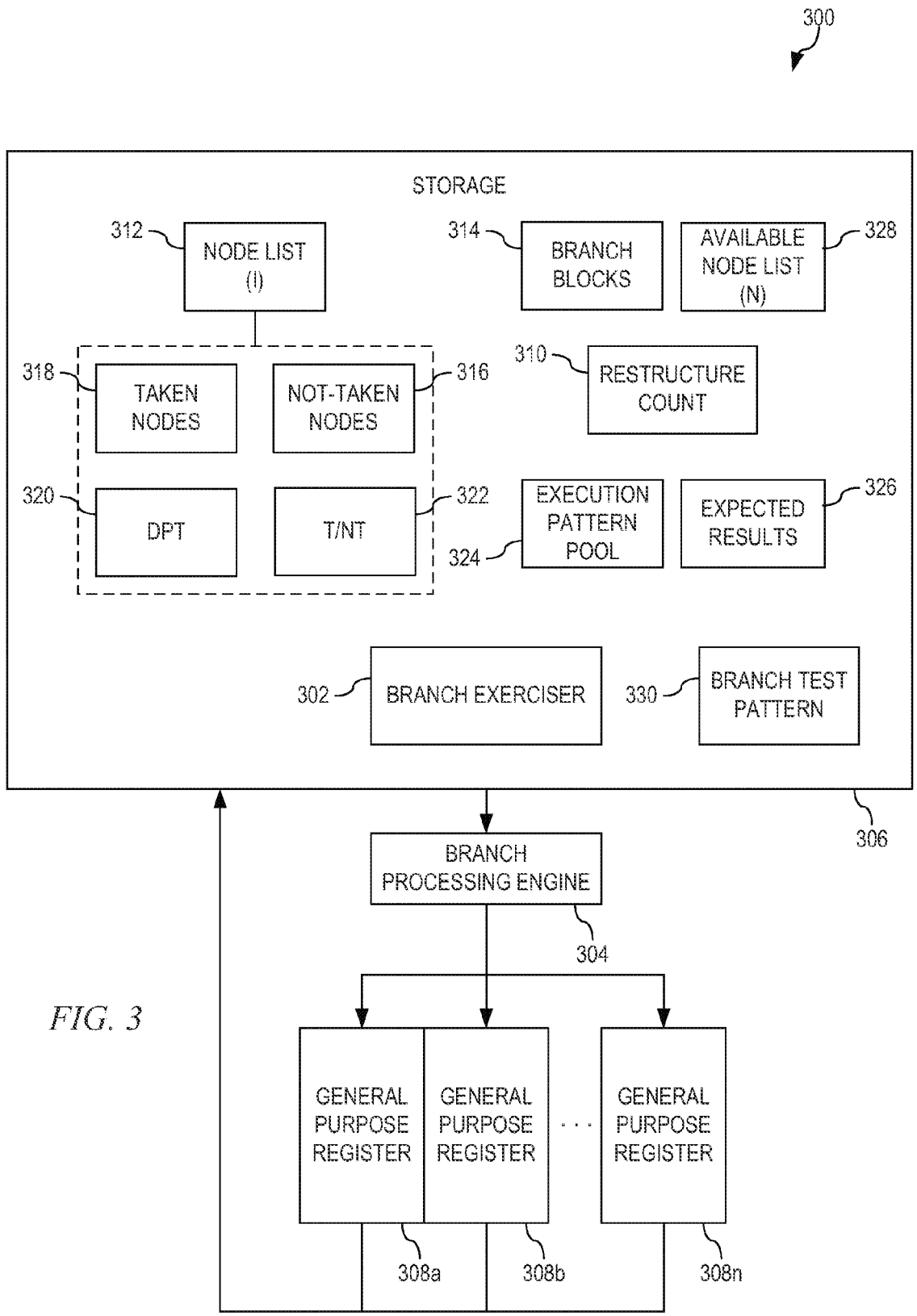
FIG. 3 depicts a block diagram of a validation mechanism for effectively validating execution units within a processor in accordance with an illustrative embodiment.

FIG. 3 depicts a block diagram of a validation mechanism for effectively validating execution units within a processor in accordance with an illustrative embodiment. Data processing system 300 comprises branch exerciser 302, branch processing engine 304, storage 306, as well as general purpose registers 308a, 308b, . . . , 308n. In order to validate branch processing engine 304, branch exerciser 302 initializes and sets restructure count 310 and a set of initial nodes (I) 312.

The restructure count 310 and the number in the set of initial nodes (I) 312 may be provided as inputs from a user of the validation mechanism. In setting up the set of initial nodes (I) 312, branch exerciser 302 allocates a portion of storage 306 as instruction memory within which branch blocks of instructions 314 will later be created. Each node in the set of initial nodes (I) 312 may be considered as an instruction block with a mix of arithmetic instructions and branches. The most basic version of such a node may be an add instruction to update a register followed by a branch instruction that transfers control to another node (instruction block) based on a condition (i.e. based on a particular Condition Register bit). Also, the type of branch instructions (branches to Count/Link Register, Relative Branches, Absolute branches, etc.) may be chosen randomly for each node. For each node in the set of initial nodes (I) 312, branch exerciser 302 also assigns random increasing addresses within the allocated instruction memory to each node.

Additionally, branch exerciser 302 also sets up a number of data structures for each node that will be used in verification of branch processing engine 304. Not-taken node data structure 316 records a not-taken path (node) for a current node. Taken node data structure 318 records a taken path (node) for the current node. In order to prevent infinite loops/deadlock scenarios, such as infinite loops that may occur when instruction execution is stuck between a set of nodes, deadlock prevention table (DPT) 320 records for each node, the set of nodes that cannot be chosen for the taken/not-taken paths from the current node. Finally, taken/not-taken (T/NT) candidate list 322 records the list of nodes that may be chosen for the taken/not-taken paths from the current node. The illustrative embodiments represent the initial set of nodes as I={xEI: x>0} and another set of nodes as M={xEI:x is already chosen for a previous iteration}.

In building the branch test pattern, branch exerciser 302 copies the set of initial nodes (I) 312 to a set of available nodes (N) 328. Branch exerciser 302 then randomly picks a node 'n' from the set of available nodes (N) 328, where N is the set of nodes that still need to be processed. Branch exerciser 302 then removes 'n' from the set of available nodes (N) 328 to avoid picking the same node for a subsequent iteration. Branch exerciser 302 then updates deadlock prevention table (DPT) 320 of the randomly selected node to avoid picking a node that can lead to an infinite loop or deadlock. In performing the update, for each node 'm' in the deadlock prevention table for node 'n', branch exerciser 302 reads the deadlock prevention table for node 'm', adds the unreachable nodes from deadlock prevention table (DPT) 320 of node 'm' to deadlock prevention table (DPT) 320 of node 'n', and repeats these steps recursively until all the unreachable nodes for the node 'm' are added to the deadlock prevention table (DPT) 320 of node 'n'.

Once the deadlock prevention table (DPT) 320 of node 'n' has been updated, branch exerciser 302 removes all the nodes that are in the DPT of node 'n' from the set of available nodes I-'n' to create a candidate list (C) from which taken/not-taken nodes are randomly selected. That is, consider a set D that contains all nodes in the deadlock prevention table (DPT) 320 for node 'n'. Then, consider a set C=I-D-'n', i.e. the set of nodes in the initial set of nodes (I) 312 that are not in the deadlock prevention table (DPT) 320 for node 'n'. This set C is the taken/not-taken (T/NT) candidate list 322 for node 'n'.

Branch exerciser 302 then randomly selects two nodes {x, y} from the taken/not-taken (T/NT) candidate list (C) 322 for a taken path (x) and a not-taken path (y). In order for this step to be properly performed, there must be at least two nodes in taken/not-taken (T/NT) candidate list 322. If there are at least two nodes in taken/not-taken (T/NT) candidate list 322, then branch exerciser 302 records the taken node in taken node data structure 318 and not-taken node in not-taken node data structure 316 for the current node.

Branch exerciser 302 then adds node 'n' to the deadlock prevention table (DPT) 320 of node 'x' and node 'y'. If the taken/not-taken (T/NT) candidate list 322 contains only one element or less than one element, i.e. there is only one node or no node that is reachable through the taken and not-taken paths from the current node, then such a node is considered and marked as an end node. For example, once execution reaches the end node, the dynamic branch pattern test case is considered to have completed execution. This build process then repeats until a point is reached such that the set N becomes NULL, i.e. all the nodes have been processed.

Branch exerciser 302 then generates an execution pattern pool 324 in which execution patterns, which may be loaded into the Condition Register (CR) before every re-execution, are stored. Each execution pattern may be either user defined or pseudo-randomly generated. In addition, branch exerciser 302 generates expected results 326 for each execution pattern in the execution pattern pool 324. These expected results contain the expected counts for the taken and not-taken paths.

With at least one branch test pattern created, during every re-execution, branch exerciser 302 selects a pattern from the execution pattern pool 324, loads the pattern into the Condition Register and then executes dynamic branch test pattern 330 on the target hardware. Again, the execution pattern comprises control bits that control the flow of branches in the generated branch test pattern 330. With different execution patterns, the taken or not taken paths for each node are varied during each and every re-execution. By varying the control bits in the execution pattern, the taken and not taken paths from each and every node may be varied. A different execution pattern during each re-execution of a same branch test pattern ensures that although the instructions do not change, since the branch instructions are dependent on particular control bits, a different execution pattern produces a different condition which causes the branch to go a node that is different from the one in the previous re-execution. Thus, for the same branch test pattern, the overall execution paths between the branch blocks differ with each differing execution pattern. This causes the processor control logic to frequently flush instructions (and discard their results) fetched from the mispredicted path and redirect instruction fetching to the alternate path which causes interesting micro-architectural scenarios. This extreme dynamism in the branch paths also causes internal hardware based branch prediction data structures such as the Local Branch History Table (LBHT), Global Branch History Table (GBHT), Global History Vector (GHV), or the like, that remember previous branch outcomes, to be updated and/or rolled frequently.

During execution, for each path that is chosen as a taken path or a not-taken path, a predetermined one of general purpose registers 308a, 308b, . . . , 308n are updated. Hence, general purpose registers 308a, 308b, . . . , 308n contain the counts for the taken and not-taken paths. Once execution reaches the end node, the branch test pattern is considered to have completed and branch exerciser 302 compares values in the predetermined general purpose registers 308a, 308b, . . . , 308n with the expected counts in expected results 326 for the taken and not-taken paths. If there is a mismatch, branch exerciser 302 dumps out the test case along with the actual and expected values of the predetermined ones of general purpose registers 308a, 308b, . . . , 308n, which may also be referred to as context information, for use in a debugging process.

If there is no mismatch, then branch exerciser 302 determines whether there is another execution pattern to be tested. If there is another execution pattern, branch exerciser 302 selects a next pattern and the test is repeated. If there is not another execution pattern, then branch exerciser 302 determines whether the restructure count in restructure count 310 has been exceeded. If restructure count 310 has not been exceeded, branch exerciser 302 builds a new branch test pattern 330 with the same set of nodes but with a different branch pattern between the nodes. If the restructure count has been exceeded, then branch exerciser 302 ends its verification of branch processing engine 304.

FIGS. 4A-4G show one example of the test case build process performed by a branch exerciser, such as branch exerciser 302 of FIG. 3, in accordance with an illustrative embodiment. This example is illustrated using seven nodes, although the illustrative embodiments are very scalable so that thousands of nodes can be built for a single test case execution. Considering the seven-node example to explain the methodology described in FIG. 3, such that the set of available nodes (N)=I={1, 2, 3, 4, 5, 6, 7}.

Figure 4A:
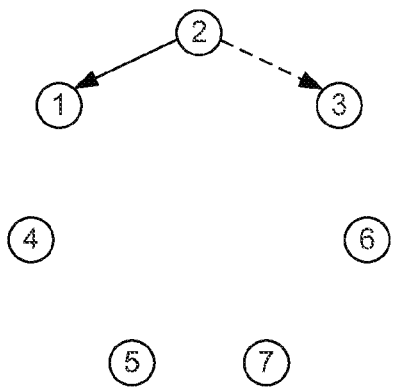
FIGS. 4A-4G show one example of the test case build process performed by a branch exerciser in accordance with an illustrative embodiment.

In a first iteration shown in FIG. 4A, the branch exerciser randomly picks node 'n'=2 from N={1, 2, 3, 4, 5, 6, 7}. The branch exerciser removes 'n'=2 from set N, such that the set of available nodes (N) still to be processed={1, 3, 4, 5, 6, 7}. The branch exerciser updates the deadlock prevention table (DPT) for node 'n'=2. Since node 2 was chosen as the first node, the DPT for node 2 is currently empty. The branch exerciser then adds nodes to the T/NT candidate list of node 2. Since the DPT for node 2 which is the set D is currently a NULL set, the T/NT candidate list C={1, 3, 4, 5, 6, 7}. The branch exerciser then randomly picks node 'x'=1 and node 'y'=3, for the taken and not-taken paths respectively from node 'n'=2. The branch exerciser records the taken path and not-taken path for 'n'=2 as shown:

| Node | Taken | Not-Taken |
|------|-------|-----------|
| 7    | 1     | 3         |

The branch exerciser then adds node 2 to the deadlock prevention table (DPT) of nodes 1 and 3 as shown:

| Node | Unreachable nodes |
|------|-------------------|
| 1    | 2                 |
| 2    |                   |
| 3    | 2                 |
| 4    |                   |
| 5    |                   |
| 6    |                   |
| 7    |                   |

Figure 4B:
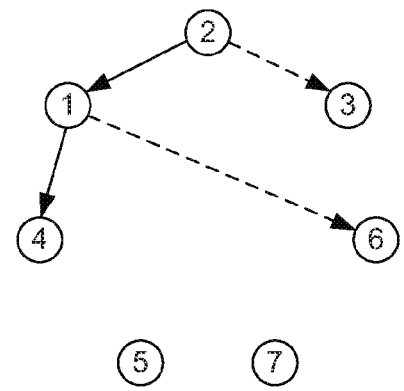

In a second iteration shown in FIG. 4B, the branch exerciser randomly picks node 'n'=1 from N={1, 3, 4, 5, 6, 7}. The branch exerciser removes 'n'=1 from set N, such that the set of available nodes (N) still to be processed={3, 4, 5, 6, 7}. The branch exerciser updates the deadlock prevention table (DPT) for node 'n'=1. The DPT for 'n'=1 is {2}. Thus, the branch exerciser adds all unreachable nodes from node 2(={NULL}) to the DPI for node 1. Therefore, the DPT for node 1={2}, shown below. The branch exerciser then adds nodes to the T/NT candidate list of node 1. Since the DPT for node 1 which is the set D={2}, the T/NT candidate list C={3, 4, 5, 6, 7}. The branch exerciser randomly picks node 'x'=4 and node 'y'=6, for the taken and not-taken paths respectively from node 'n'=1. The branch exerciser records the taken and not-taken paths for 'n'=1 as shown:

| Node | Taken | Not-Taken |
|------|-------|-----------|
| 2    | 1     | 3         |
| 1    | 4     | 6         |

The branch exerciser then adds node 1 to the deadlock prevention table (DPT) of nodes 4 and 6 as shown:

| Node | Unreachable nodes |
|------|-------------------|
| 1    | 2                 |
| 2    |                   |
| 3    | 2                 |
| 4    | 1                 |
| 5    |                   |
| 6    | 1                 |
| 7    |                   |

Figure 4C:
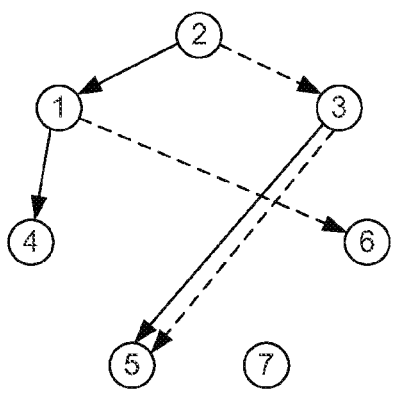

In a third iteration shown in FIG. 4C, the branch exerciser randomly pick node 'n'=3 from N={3, 4, 5, 6, 7}. The branch exerciser removes 'n'=3 from set N, such that the set of available nodes (N) still to be processed={4, 5, 6, 7}. The branch exerciser updates the deadlock prevention table (DPT) for node 'n'=3. The DPT for 'n'=3 is {2}. Thus, the branch exerciser add all unreachable nodes from node 2(={NULL}) to the DPT for node 3. Therefore, the DPT for node 3={2}, shown below. The branch exerciser then adds nodes to the T/NT candidate list of node 3. Since the DPT for node 3 which is the set D={2}, the T/NT candidate list C={1, 4, 5, 6, 7}. The branch exerciser randomly picks node 'x'=5 and node 'y'=5, for the taken and not-taken paths respectively from node 'n'=3. The branch exerciser records the taken and not-taken paths for 'n'=3 as shown:

| Node | Taken | Not-Taken |
|------|-------|-----------|
| 2    | 1     | 3         |
| 1    | 4     | 6         |
| 3    | 5     | 5         |

The branch exerciser then adds node 3 to the deadlock prevention table (DPT) of node 5 as shown:

| Node | Unreachable nodes |
|------|-------------------|
| 1    | 2                 |
| 2    |                   |
| 3    | 2                 |
| 4    | 1                 |
| 5    | 3                 |
| 6    | 1                 |
| 7    |                   |

Figure 4D:
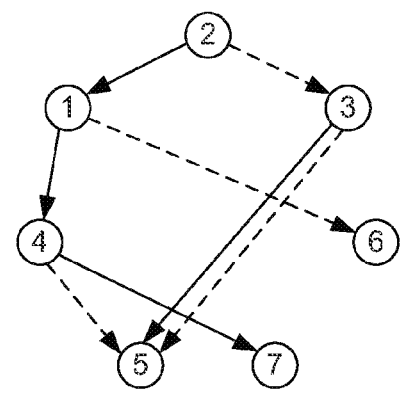

In a fourth iteration shown in FIG. 4D, the branch exerciser randomly picks node 'n'=4 from N={4, 5, 6, 7}. The branch exerciser removes 'n'=4 from set N, such that the set of available nodes (N) still to be processed={5, 6, 7}. The DPT for 'n'=4 is {1}. Thus, the branch exerciser add all unreachable nodes from node 1(×{2}) to the DPT for node 4. The branch exerciser then recursively adds the unreachable nodes from nodes 2 to the DPT of node '4'. Therefore, the DPT for node 4={1, 2}, shown below. The branch exerciser then adds nodes to the T/NT candidate list of node 4. Since the DPT for node 4 which is the set D={1, 2}, the T/NT candidate list C={3, 5, 6, 7}. The branch exerciser randomly picks node 'x'=7 and node 'y'=5, for the taken and not-taken paths respectively from node 'n'=4. The branch exerciser records the taken and not-taken paths for 'n'=4 as shown:

| Node | Taken | Not-Taken |
|------|-------|-----------|
| 2    | 1     | 3         |
| 1    | 4     | 6         |
| 3    | 5     | 5         |
| 4    | 7     | 5         |

The branch exerciser then adds node 4 to the deadlock prevention table (DPT) of nodes 5 and 7 as shown:

| Node | Unreachable nodes |
|------|-------------------|
| 1    | 2                 |
| 2    |                   |
| 3    | 2                 |
| 4    | 1, 2              |
| 5    | 3, 4              |
| 6    | 1                 |
| 7    | 4                 |

Figure 4E:
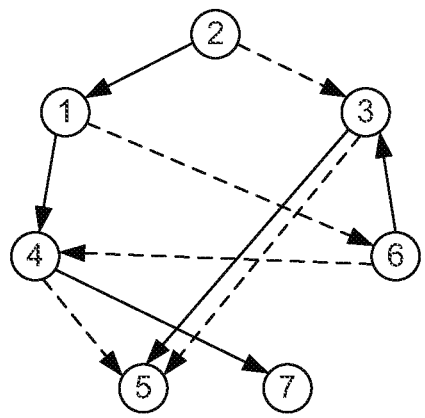

In a fifth iteration shown in FIG. 4E, the branch exerciser randomly pick a node 'n'=6 from N={5, 6, 7}. The branch exerciser removes 'n'=6 from set N, such that the set of available nodes (N) still to be processed={5, 7}. The branch exerciser updates the deadlock prevention table (DPT) for node 'n'=6. The current DPT for 'n'=6 is {1}. The branch exerciser adds all unreachable nodes from node 1(={2}) to the DPT for node 6. The branch exerciser then recursively adds the unreachable nodes from nodes 2 to the DPT of node '6'. Thus, the DPT for node 6={1, 2}, shown below. The branch exerciser then adds nodes to the T/NT candidate list of node 6. Since the DPT for node 6={1, 2}, the branch exerciser adds nodes to the T/NT candidate list of node 6, such that the T/NT candidate list C={3, 4, 5, 7}. The branch exerciser randomly pick node 'x'=3 and node 'y'=4, for the taken and not-taken paths respectively from node 'n'=6. The branch exerciser records the taken and not-taken paths for 'n'=6 as shown below:

| Node | Taken | Not-Taken |
|------|-------|-----------|
| 2    | 1     | 3         |
| 1    | 4     | 6         |
| 3    | 5     | 5         |
| 4    | 7     | 5         |
| 6    | 3     | 4         |

The branch exerciser then adds node 6 to the deadlock prevention table (DPT) of nodes 3 and 4 as shown:

| Node | Unreachable nodes |
|------|-------------------|
| 1    | 2                 |
| 2    |                   |
| 3    | 2, 6              |
| 4    | 1, 2, 6           |
| 5    | 3, 4              |
| 6    | 1, 2              |
| 7    | 4                 |

Figure 4F:
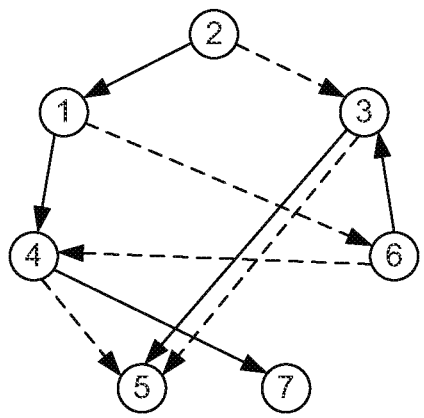

In a sixth iteration shown in FIG. 4F, the branch exerciser randomly pick a node 'n'=5 from N={5, 7}. The branch exerciser removes 'n'=5 from set N, such that the set of available nodes (N) still to be processed={7}. The branch exerciser updates the deadlock prevention table (DPT) for node 'n'=5. The current DPT for 'n'=5 is {3, 4}. The branch exerciser adds all unreachable nodes from node 3(={2, 6}) and node 4(={1, 2, 6}) to the DPT for node 5. The branch exerciser then recursively adds the unreachable nodes from nodes 1, 2 and 6 to the DPT of node '5'. Thus, the DPT for node 5={1, 2, 3, 4, 6}, shown below. The branch exerciser then adds nodes to the T/NT candidate list of node 5. Since the DPT for node 5={1, 2, 3, 4, 6}, the branch exerciser adds nodes to the T/NT candidate list of node 5, such that the T/NT candidate list C={7}. Since there is only one node (=7) that is reachable from node 5, this is identified as the endpoint of the algorithm and node 5 is designated as the end node, i.e. the execution ends after control reaches this node.

| Node | Unreachable nodes |
|---|---|
| 1 | 2 |
| 2 | |
| 3 | 2, 6 |
| 4 | 1, 2, 6 |
| 5 | 3, 4, 1, 2, 6 |
| 6 | 1, 2 |
| 7 | 4 |

Figure 4G:
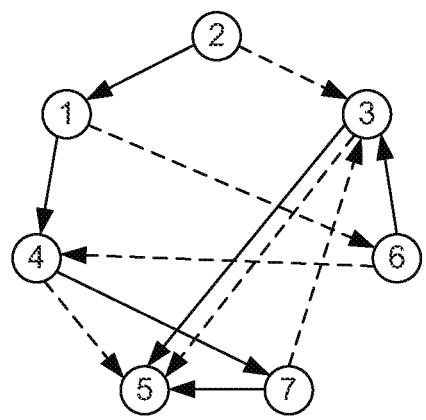

In a seventh iteration shown in FIG. 4G, the branch exerciser randomly picks a node 'n'=7 from N={7}. The branch exerciser removes 'n'=7 from set N, such that the set of available nodes (N) still to be processed={NULL}. The branch exerciser updates the deadlock prevention table (DPT) for node 'n'=7. The current DPT for 'n'=7 is {4}. The branch exerciser adds all unreachable nodes from node 4(={1, 2, 6}) to the DPT for node 7. Thus, the DPT for node 7={1, 2, 4, 6}, shown below. The branch exerciser then recursively adds the unreachable nodes from nodes 1, 2 and 6 to the DPT of node '7'. The branch exerciser then adds nodes to the T/NT candidate list of node 7. Since the DPT for node 7={1, 2, 4, 6}, the branch exerciser adds nodes to the T/NT candidate list of node 7, such that the T/NT candidate list C={3, 5}. The branch exerciser randomly pick node 'x'=5 and node 'y'=3, for the taken and not-taken paths respectively from node 'n'=7. The branch exerciser records the taken and not-taken paths for 'n'=7 as shown below:

| Node | Taken | Not-Taken |
|---|---|---|
| 2 | 1 | 3 |
| 1 | 4 | 6 |
| 3 | 5 | 5 |
| 4 | 7 | 5 |
| 6 | 3 | 4 |
| 7 | 5 | 3 |

The branch exerciser then adds node 7 to the deadlock prevention table (DPT) of nodes 3 and 5 as shown:

| Node | Unreachable nodes |
|---|---|
| 1 | 2 |
| 2 | |
| 3 | 2, 6, 7 |
| 4 | 1, 2, 6 |
| 5 | 3, 4, 1, 2, 6, 7 |
| 6 | 1, 2 |
| 7 | 4, 1, 2, 6 |

Figure 5A:
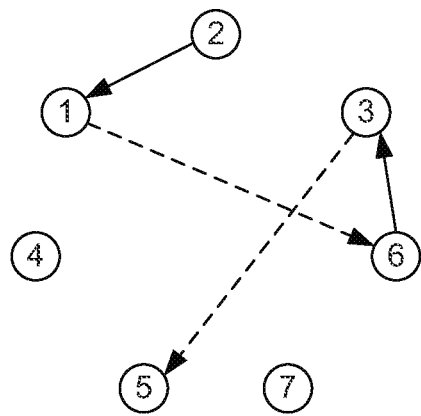
FIGS. 5A and 5B illustrate examples of an execution pattern using the branch test pattern of FIG. 4G in accordance with an illustrative embodiment.
Figure 5B:
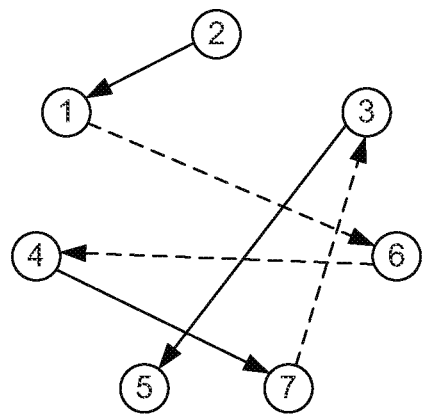

FIGS. 5A and 5B illustrate examples of an execution pattern using the branch test pattern of FIG. 4G in accordance with an illustrative embodiment. Since any branch instruction depends on a particular condition being satisfied, i.e. depends on bits of the condition register, a pattern loaded into this condition register is called the "execution pattern." This execution pattern is loaded into the condition register before every re-execution of the branch test pattern. The branch instruction may be encoded to take a branch based on a particular condition register bit being 1 or 0. For example, with regard to FIG. 5A, a branch is taken (execution follows a solid line) from a node if a bit in the condition register that it depends on is a 1, otherwise the branch is not taken (execution follows a dashed line) if a bit in the condition register that it depends on is a 0. Although for the example an assumption is made that the branch is taken if the condition register bit that the branch depends on is a 1 and not taken if it is a 0, the reverse is also possible, i.e. branch can be taken if the condition register bit is 0 and not-taken if the bit is 1. Therefore, if an execution pattern is selected from the execution pattern pool is 101001 into the condition register (CR) for the first execution, then from Node 2 where execution begins, the first bit is a 1 so the taken path will be used to go to Node 1. Since the second bit is a 0, then Node 1 uses the not-taken path to go to Node 6. The third bit is a 1, thus Node 6 uses the taken path to go to Node 3. Finally, the fourth bit is a 0, so Node 3 uses the not-taken path to go to Node 5. Since 5 is the end node, execution ends.

Similarly, with regard to FIG. 5B, if an execution pattern is selected from the execution pattern pool is 100101 into the condition register (CR) for the second execution, then from Node 2 where execution begins, the first bit is a 1 so the taken path will be used to go to Node 1. Since the second bit is a 0, then Node 1 uses the not-taken path to go to Node 6. The third bit is a 0, thus Node 6 uses the not-taken path to go to Node 4. The fourth bit is a 1, so Node 4 uses the taken path to go to Node 7. The fifth bit is a 0, so Node 7 uses the not-taken path to go to Node 3. The sixth bit is 1, so Node 3 uses the taken path to go to Node 5. Since 5 is the end node, execution ends.

The examples shown in FIGS. 5A and 5B are relatively simple examples. In reality, there are thousands of such nodes and the branches from each node can randomly use any CR bit to decide its path. As can be seen, with every re-execution, the path followed between the nodes is different. The hardware internally uses branch prediction data structures such as Local Branch History Table (LBHT), Global Branch History Table (GBHT), Global History Vector (GHV), and/or other mechanisms to predict branch direction. To predict the branch direction of a branch instruction, prediction logic uses the information about previous branch outcomes for the same instructions stored in the above mentioned hardware data structures to predict the branch outcome for the current execution of the same instructions. The extreme dynamism in the branch paths created by the branch exerciser irritates the above mentioned internal hardware based branch prediction data structures since they are rolled and/or updated frequently. This leads to interesting micro architectural scenarios.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including art object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
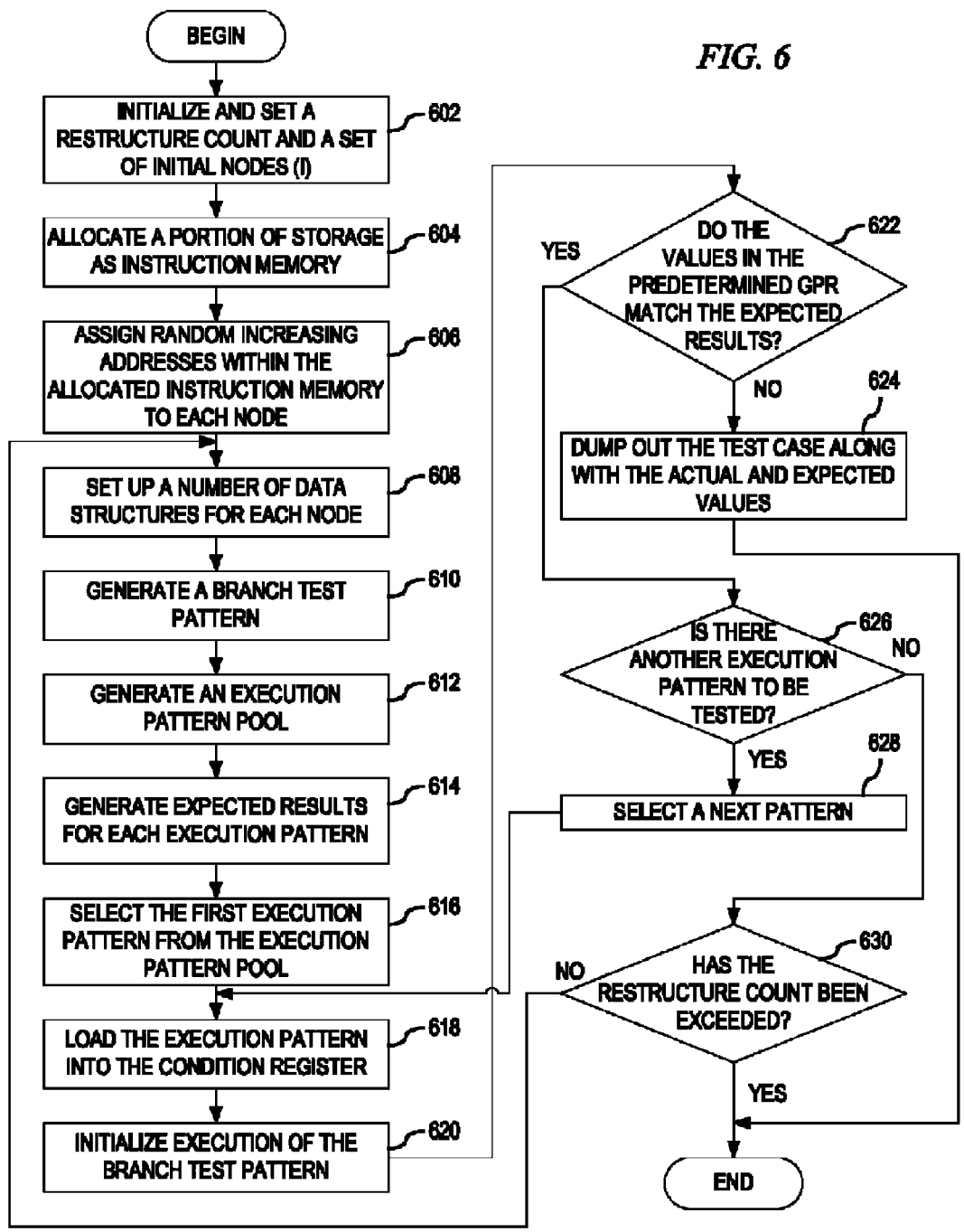
FIG. 6 depicts an exemplary flowchart of the operation performed in effectively validating execution units within a processor in accordance with an illustrative embodiment.

FIG. 6 depicts an exemplary flowchart of the operation performed in effectively validating execution units within a processor in accordance with an illustrative embodiment. As the operation begins, a branch exerciser initializes and sets a restructure count and a set of initial nodes (I) (step 602). In setting up the set of initial nodes (I), the branch exerciser allocates a portion of storage as instruction memory within which branch blocks of instructions will be created (step 604). For each node in the set of initial nodes (I), the branch exerciser assigns random increasing addresses within the allocated instruction memory to each node (step 606).

The branch exerciser also sets up a number of data structures for each node (step 608). The data structures comprise a not-taken node data structure that records a not-taken path (node) for a current node, a taken node data structure that records a taken path (node) for the current node, a deadlock prevention table (DPT) that records for each node, a set of nodes that cannot be chosen for the taken/not-taken paths from the current node, and a taken/not-taken (T/NT) candidate list records the list of nodes that may be chosen for the taken/not-taken paths from the current node. The branch exerciser then generates a branch test pattern for execution by the execution unit (step 610). The branch exerciser then generates an execution pattern pool in which execution patterns, which may be loaded into the Condition Register (CR) before every re-execution, are stored (step 612). Each execution pattern may be either user defined or pseudo-randomly generated.

Figure 7:
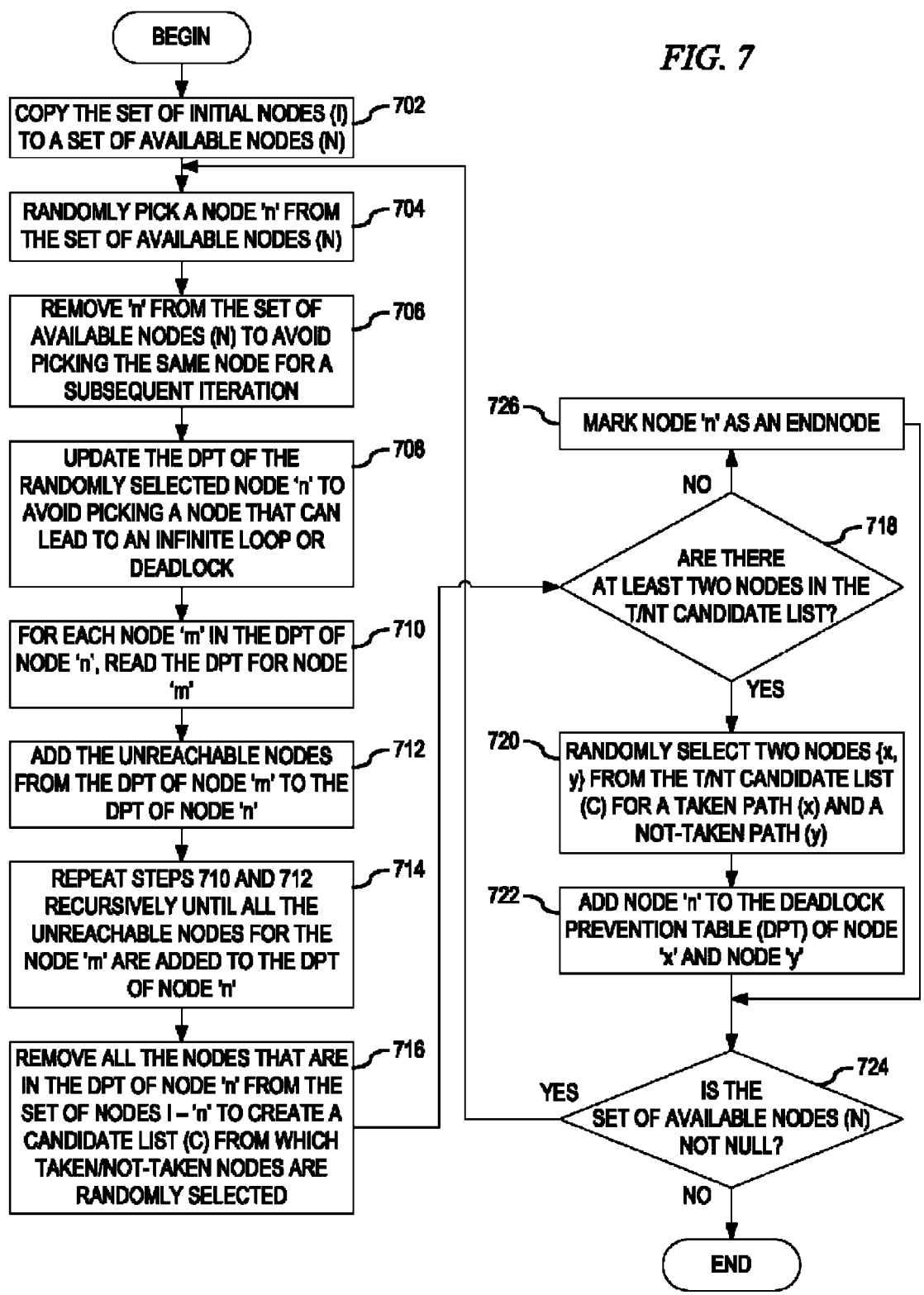
FIG. 7 depicts an exemplary flowchart of the operation performed in generating a branch test pattern in accordance with an illustrative embodiment.

The branch exerciser then generates expected results for each execution pattern in the execution pattern pool (step 614). The branch exerciser selects the first execution pattern from the execution pattern pool (step 616) and loads the execution pattern into the Condition Register (step 618). The process of generating the branch test pattern is illustrated in FIG. 7. The branch exerciser then initializes the execution of the execution pattern on the target hardware (step 620). During execution, for each path that is chosen as a taken path or a not-taken path, the execution unit updates a predetermined general purpose register so that the general purpose register contains the counts for the taken and not-taken paths. Once execution reaches the end node, the branch test pattern is considered to have completed and the branch exerciser compares values in the predetermined general purpose register with the expected counts in the expected results for the taken and not-taken paths (step 622). If at step 622 there is a mismatch, the branch exerciser dumps out the test case along with the actual and expected values of the predetermined general purpose register, which may also be referred to as context information, for use in a debugging process (step 624), with the operation ending thereafter.

If at step 622 there is no mismatch, then the branch exerciser determines whether there is another execution pattern to be tested (step 626). If at step 626 there is another execution pattern, the branch exerciser selects a next pattern (step 628) and the operation proceeds to step 618. If at step 626 there is not another execution pattern, then the branch exerciser determines whether the restructure count has been exceeded (step 630). If at step 630 the restructure count has not been exceeded, the operation proceeds to step 608 where the branch exerciser sets up a number of data structures for each node and generates a new branch test pattern with the same set of nodes but with a different branch pattern between the nodes. If at step 630 the restructure count has been exceeded, then the branch exerciser ends its verification of the execution unit.

FIG. 7 depicts an exemplary flowchart of the operation performed in generating a branch test pattern in accordance with an illustrative embodiment. As the operation begins, a branch exerciser copies the set of initial nodes (I) to a set of available nodes (N) (step 702). The branch exerciser then randomly picks a node 'n' from the set of available nodes (N), where N is the set of nodes that still need to be processed (step 704). The branch exerciser then removes 'n' from the set of available nodes (N) to avoid picking the same node for a subsequent iteration (step 706). The branch exerciser then updates the deadlock prevention table (DPT) of the randomly selected node 'n' to avoid picking a node that can lead to an infinite loop or deadlock (step 708).

In performing the update, for each node 'm' in the deadlock prevention table for node 'n', the branch exerciser reads the deadlock prevention table for node 'm' (step 710), adds the unreachable nodes from the deadlock prevention table (DPT) of node 'm' to deadlock prevention table (DPT) of node 'n' (step 712), and repeats steps 710 and 712 recursively until all the unreachable nodes for the node 'm' are added to the deadlock prevention table (DPI) of node 'n' (step 714). Once the deadlock prevention table (DPT) of node 'n' has been updated, the branch exerciser removes all the nodes that are in the DPT of node 'n' from the set of nodes I–'n' to create a candidate list (C) from which taken/not-taken nodes are randomly selected (step 716). That is, consider a set D that contains all nodes in the deadlock prevention table (DPT) for node 'n'. Then, consider a set C=I–D–'n', i.e. the set of nodes in the initial set of nodes (I) that are not in the deadlock prevention table (DPT) for node 'n'. This set C is the taken/not-taken (T/NT) candidate list for node 'n'.

The branch exerciser unit then determines whether there are at least two nodes in the taken/not-taken (T/NT) candidate list (step 718). If at step 718 there are at least two nodes in the taken/not-taken (T/NT) candidate list, the branch exerciser then randomly selects two nodes {x, y} from the taken/not-taken (T/NT) candidate list (C) for a taken path (x) and a not-taken path (y) (step 720). The branch exerciser then adds node 'n' to the deadlock prevention table (DPT) of node 'x' and node 'y' (step 722). The branch exerciser unit then determines whether the set of nodes still to be processed 'N' is not a NULL set (step 724). If at step 724 the set of nodes still to be processed 'N' is not a NULL set, then the operation (build algorithm) returns to step 704. If at step 724 the set of nodes still to be processed 'N' is NULL, then the operation (building process) terminates. If at step 718 there fails to be at least two nodes in the taken/not-taken (T/NT) candidate list, the branch exerciser marks the node 'n' as end node (step 726) and proceeds to step 724.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for effectively validating execution within a processor. In order to properly stress a branch unit during validation, the illustrative embodiments provide a test case with dynamic branch patterns that stresses a branch unit under validation to the extreme. Further, the illustrative embodiments provide for generating a controlled dynamic pattern test case to stress any advanced features within a processor. That is, the dynamic pattern test case of the illustrative embodiments provides use of an advanced algorithm to generate critical test-cases to validate issues related to icache, branch, instruction fetch unit (IFU), or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for effectively validating execution units within a processor, the method comprising:

generating, by a processor, a branch test pattern for execution by an execution unit that is under validation testing, wherein generating the branch test pattern further comprises:

copying, by the processor, a set initial nodes (I) to a set of available nodes (N);

randomly picking, by the processor, a node 'n' from the set of available nodes (N), wherein N is a set of nodes that still need to be processed;

removing, by the processor, the node 'n' from the set of available nodes (N) to avoid picking the same node for a subsequent iteration;

updating, by the processor, a deadlock prevention table (DPT) of node 'n' to avoid picking another node that leads to an infinite loop or deadlock;

removing, by the processor, all nodes in the DPT of node 'n' from the set of available nodes I–'n' in order to create a candidate list (C) from which taken/not-taken nodes are randomly selected;

determining, by the processor, whether there are at least two nodes in the candidate list (C);

responsive to at least two nodes being in the candidate list (C), randomly selecting, by the processor, two nodes {x, y} from the candidate list (C) for a taken path (x) and a not-taken path (y);

adding, by the processor, node 'n' to a deadlock prevention table (DPT) of node 'x' and a deadlock prevention table (DPT) of node 'y';

determining, by the processor, whether the candidate list (C) contains only one element or less than one element;

responsive to the candidate list (C) containing only one element or less than one element, designating, by the processor, a last used node 'n' or remaining node 'n' as an end node; and generating, by the processor, the branch test pattern;

for each execution pattern in a set of execution patterns:

selecting, by the processor, an execution pattern from the set of execution patterns thereby forming a selected execution pattern;

loading, by the processor, the selected execution pattern into a condition register;

executing, by an execution unit, the branch test pattern based on the selected execution pattern in the condition register;

responsive to the branch test pattern ending, comparing, by the processor, values output from the execution unit during execution of the branch test pattern to a set of expected results for the selected execution pattern; and determining, by the processor, whether there is a match of the comparison of the values output from the execution unit during execution of the branch test pattern to the set of expected results for the selected execution pattern; and responsive to a match of the comparison for each execution pattern in the set of execution patterns, validating, by the processor, the execution unit.

2. The method of claim 1, wherein each execution pattern in the set of execution patterns is either user defined or pseudo-randomly generated.

3. The method of claim 1, further comprising:

responsive to a mismatch of the comparison for at least one execution pattern in the set of execution patterns, invalidating, by the processor, the branch test pattern; and dumping out, by the processor, the branch test pattern along with all context information for use in a debugging process.

4. The method of claim 1, wherein the process performed for each execution pattern in the set of execution patterns is repeated for each execution pattern in the set of execution patterns up to a point where a restructure count is exceeded, and wherein, when the restructure count is exceeded and all previous comparisons match, the processor validates the execution unit.

5. The method of claim 1, further comprising:

responsive to the candidate list containing more than one element, repeating, by the processor, the branch test pattern generation process until the set of available nodes (N) still to be processed in the branch test pattern generation process is NULL.

6. The method of claim 1, further comprising:

responsive to a failure of the candidate list (C) having at least two nodes, determining, by the processor, whether the set of available nodes (N) is not NULL; and responsive to the set of available nodes (N) being not NULL, repeating, by the processor, the process until the set of available nodes (N) is NULL.

7. The method of claim 1, wherein updating the DPT of node 'n' further comprises:

for each node 'm' in the DPT for node 'n', reading, by the processor, a deadlock prevention table (DPT) for node 'm';

adding, by the processor, unreachable nodes from the DPT of node 'm' to the DPT of node 'n'; and repeating, by the processor, the reading and adding steps recursively until all the unreachable nodes for the node 'm' are added to the DPT of node 'n'.

* * * * *